(12) United States Patent
Foschini et al.

(10) Patent No.: US 8,849,353 B2
(45) Date of Patent: Sep. 30, 2014

(54) METHOD OF GROUPING USERS TO REDUCE INTERFERENCE IN MIMO-BASED WIRELESS NETWORK

(75) Inventors: Gerard J. Foschini, South Amboy, NJ (US); Taesang Yoo, San Diego, CA (US)

(73) Assignee: Alcatel Lucent, Boulogne-Billancourt (FR)

( * ) Notice: Subject to any disclaimer, the term of this patent is extended or adjusted under 35 U.S.C. 154(b) by 1148 days.

(21) Appl. No.: 11/796,328

(22) Filed: Apr. 27, 2007

(65) Prior Publication Data
US 2008/0268834 A1 Oct. 30, 2008

(51) Int. Cl.
*H04M 1/00* (2006.01)
*H04B 7/04* (2006.01)

(52) U.S. Cl.
CPC ............ *H04B 7/0452* (2013.01); *H04B 7/0465* (2013.01)
USPC ..................... 455/562.1; 455/67.11; 455/101; 455/426.1; 375/260

(58) Field of Classification Search
CPC ...................................................... H04B 7/0465
USPC .......... 455/67.11, 101, 426.1, 562.1; 375/260
See application file for complete search history.

(56) References Cited

U.S. PATENT DOCUMENTS

| | | | |
|---|---|---|---|
| 2004/0240378 A1* | 12/2004 | Kei Ng et al. | 370/206 |
| 2006/0056533 A1* | 3/2006 | Molisch et al. | 375/267 |
| 2006/0203777 A1* | 9/2006 | Kim et al. | 370/334 |
| 2007/0066229 A1* | 3/2007 | Zhang et al. | 455/67.11 |
| 2007/0066237 A1* | 3/2007 | Zhang et al. | 455/69 |
| 2007/0248172 A1* | 10/2007 | Mehta et al. | 375/260 |

OTHER PUBLICATIONS

Taesang Yoo & A. Goldsmith, *On the optimality of multiantenna broadcast scheduling using zero-forcing beamforming*, IEEE Journal on Selected Areas in Communications, vol. 24, Issue 3, 528-541 (Mar. 2006).

Taesang Yoo & A. Goldsmith, *Optimality of zero-forcing beamforming with multiuser diversity*, 2005 IEEE International Conference on Communications, vol. 1, 542-546 (May 2005).

Taesang Yoo & A. Goldsmith, *Sum-rate optimal multi-antenna downlink beamforming strategy based on clique search*, IEEE Global Telecommunications Conference 2005, vol. 3 (Nov. 28-Dec. 2, 2005).

\* cited by examiner

*Primary Examiner* — Hsin-Chun Liao
(74) *Attorney, Agent, or Firm* — McCormick, Paulding & Huber LLP

(57) ABSTRACT

In a system of MIMO communications in a wireless network, a number of wireless units are logically divided into a plurality of user groups, through operation of a semi-orthogonal user selection sub-system. For example, the user selection sub-system may implement a heuristic user selection algorithm based on near-orthogonality. Each user group is assigned a discrete transmission channel, which may be orthogonally defined in terms of frequency, time, or code. Data is transmitted over the channels (e.g., from network base stations) in a coherently coordinated manner, according to a zero-forcing beamforming operation. The system may be configured for operation in a time/frequency selective manner, e.g., over time/frequency selective fading channels. The wireless units may be allocated to the time/frequency slots based on prioritization of channel strength and considerations of fairness, in conjunction with the application of a semi-orthogonal user selection algorithm.

18 Claims, 7 Drawing Sheets

$$42\left[\begin{array}{l}\max R\\ \text{s.t} \sum_{k=1}^{\lceil K(1-P_b)\rceil} \dfrac{N_0 W_k}{\|\mathbf{h}_k\|^2}\left(2^{\frac{R}{W_k}}-1\right) \leq K(1-P_b)\bar{P}\\ \\ \sum_{k=1}^{\lceil K(1-P_b)\rceil} W_k \leq K(1-P_b)\bar{W}\\ \\ W_k \geq 0, k=1,\cdots,\lceil K(1-P_b)\rceil\end{array}\right.$$

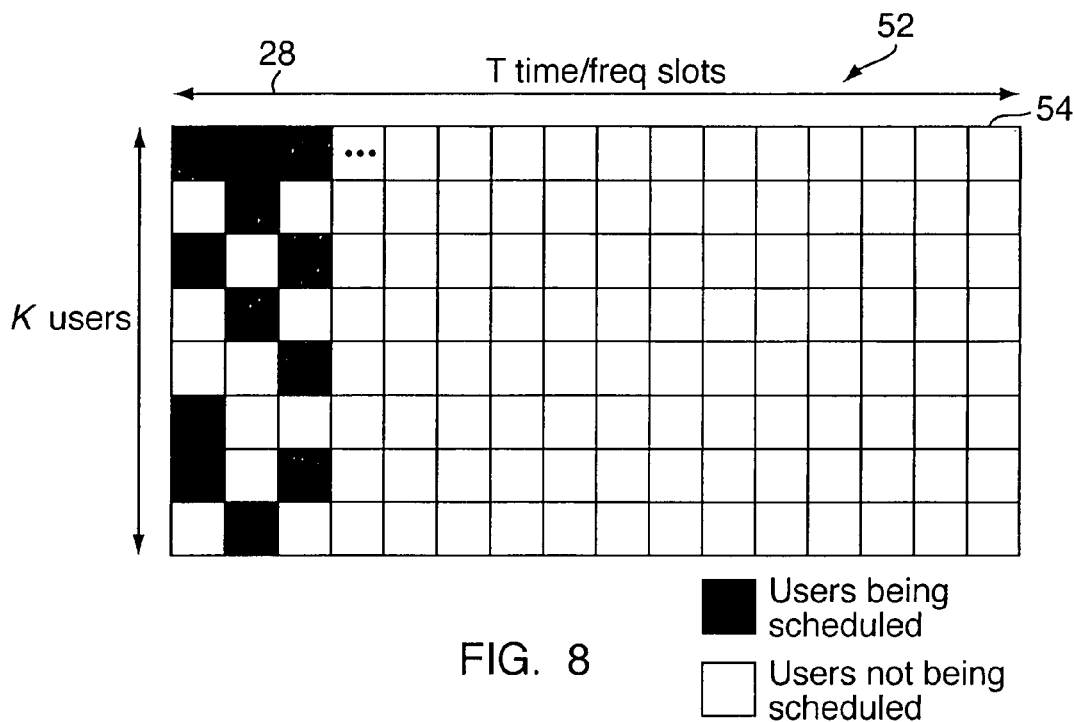
FIG. 8
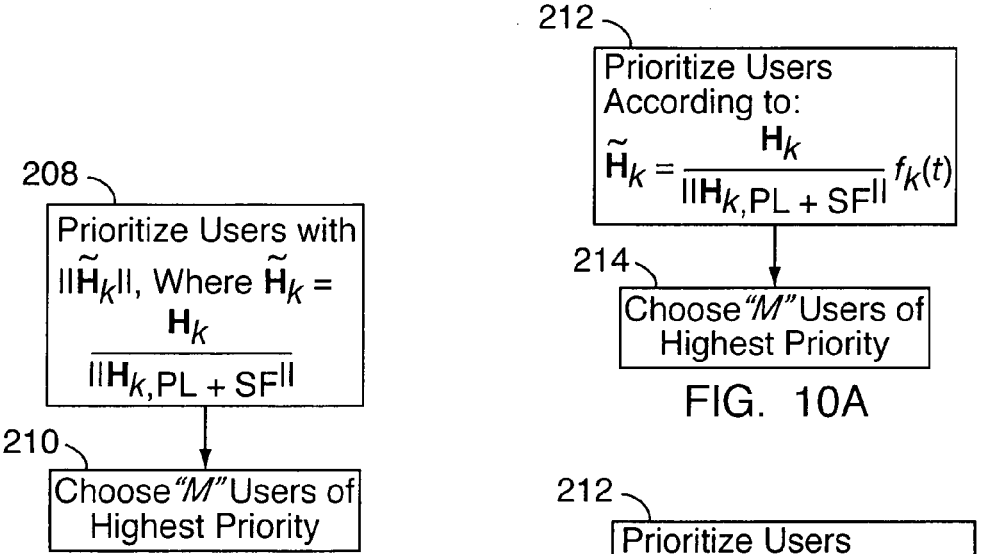
FIG. 9
FIG. 10A
FIG. 10B $R_{\text{OPT}} = \text{maximize } R$ subject to $$TR - \sum_{t \in \mathcal{T}_k} W \log_2 \left(1 + \frac{P_{kt}}{N_0 W}\right) \leq 0, \quad \forall k \in \mathcal{S}$$

$$g_m = \sum_{t=1}^{T} \sum_{k \in \mathcal{S}_t} |W_{mkt}|^2 P_{kt} - TP \leq 0, \quad 1 \leq m \leq M$$

$$P_{kt} \geq 0, \quad k \in \mathcal{S}_t, \quad 1 \leq t \leq T$$

$P_{\min} = \text{minimize } P_{\text{sum}}$ subject to $$TR - \sum_{t \in \mathcal{T}_k} W \log_2 \left(1 + \frac{P_{kt}}{N_0 W}\right) \leq 0, \quad \forall k \in \mathcal{S}$$

$$\sum_{m=1}^{M} \sum_{t=1}^{T} \sum_{k \in \mathcal{S}_t} |W_{mkt}|^2 P_{kt} - P_{\text{sum}} \leq 0$$

$$P_{kt} \geq 0, \quad k \in \mathcal{S}_t, \quad 1 \leq t \leq T$$

58

FIG. 12A $$L = P_{\text{sum}} - \sum_{t=1}^{T} \sum_{k \in \mathcal{S}_t} \lambda_{kt} P_{kt}$$

$$+ \nu \left( \sum_{m=1}^{M} \sum_{t=1}^{T} \sum_{k \in \mathcal{S}_t} |W_{mkt}|^2 P_{kt} - P_{\text{sum}} \right)$$

$$+ \sum_{k \in \mathcal{S}} (N_0 \ln 2) \omega_k \left( TR - \sum_{t \in \mathcal{T}_k} W \log_2 \left(1 + \frac{P_{kt}}{N_0 W}\right) \right)$$

60

FIG. 12B $$R = \frac{1}{T} \sum_{t \in T_k} \left( \log_2 \left( \frac{\omega_k}{\sum_{m=1}^{M} |W_{mkt}|^2} \right) \right)^+, 1 \leq k \leq K \quad \overset{64}{\longleftarrow}$$

$$P_{kt} = N_0 W \left( \frac{w_k}{\sum_{m=1}^{M} |W_{mkt}|^2} - 1 \right)^+, k \in S_t, 1 \leq t \leq T \quad \overset{62}{\longleftarrow}$$

$$P_{\min} = \sum_{m=1}^{M} \sum_{t=1}^{T} \sum_{k \in S_t} |W_{mkt}|^2 P_{kt} \quad \overset{66}{\longleftarrow}$$

FIG. 12C

| | |
|---|---|
| Step I | Set $R = R_{\text{initial}}$, $R_{\text{low}} = 0$ and $R_{\text{high}} = \infty$ |
| Step II | Calculate $P_{\min}$ through (37)-(39) |
| Step III | If $P_{\min} \leq MTP$, then $R := \min\{\frac{R_{\text{high}} + R}{2}, 2R\}$, $R_{\text{low}} := R$. |
| | If $P_{\min} > MTP$, then $R := \frac{R_{\text{low}} + R}{2}$, $R_{\text{high}} := R$. |
| Step IV | Repeat Steps II-III until $R_{\text{high}} - R_{\text{low}} <$ Tolerance. |
| Step V | $R_{\text{UB}} = R$. |

FIG. 13

METHOD OF GROUPING USERS TO REDUCE INTERFERENCE IN MIMO-BASED WIRELESS NETWORK

FIELD OF THE INVENTION

The present invention relates to communication systems and, more particularly, to methods of radio frequency communications in a wireless network.

BACKGROUND OF THE INVENTION

Wireless, radio frequency (RF) communication systems enable people to communicate with one another over long distances without having to access landline-connected devices such as conventional telephones. In a typical cellular telecommunications network (e.g., mobile phone network), an area of land covered by the network is geographically divided into a number of cells or sectors, which are typically contiguous and which together define the coverage area of the network. Each cell is served by a base station, which includes one or more fixed/stationary transceivers and antennae for wireless communications with a set of distributed wireless units (e.g., mobile phones) that provide service to the network's users. The base stations are in turn connected (either wirelessly or through land lines) to a mobile switching center ("MSC") and/or radio network controller ("RNC"), which serve a particular number of base stations depending on network capacity and configuration. The MSC and RNC act as the interface between the wireless/radio end of the network and a public switched telephone network or other network(s) such as the Internet, including performing the signaling functions necessary to establish calls or other data transfer to and from the wireless units.

Various methods exist for conducting wireless communications between the base stations and wireless units. Examples include CDMA (code division multiple access), TDMA (time division multiple access), and OFDM (orthogonal frequency-division multiplexing). CDMA, widely implemented in wireless networks in the United States, is a spread-spectrum multiplexing scheme wherein transmissions from wireless units to base stations are across a single frequency bandwidth known as the reverse link. Generally, each wireless unit is allocated the entire bandwidth all of the time, with the signals from individual wireless units being differentiated from one another using an encoding scheme. Transmissions from base stations to wireless units are across a similar frequency bandwidth known as the forward link. In TDMA-based systems, which are widely used in Europe and elsewhere, frequency channels are divided into time slots for sharing among a plurality of users, e.g., the information for each user occupies a separate time slot of the frequency channel. In OFDM, the available RF bandwidth is divided into several sub-channels. The bit stream to be transmitted is split into a plurality of parallel, low-rate bit streams. Each bit stream is transmitted over one of the sub-channels by modulating a sub-carrier using a standard modulation scheme. The sub-carrier frequencies are chosen so that the modulated data streams are orthogonal to one other, meaning that interference between the sub-channels is eliminated.

Many wireless networks have a government-assigned frequency spectrum for supporting communications between the end users' wireless units and the network's base stations. Because of this limited bandwidth, and because the demand on this bandwidth increases as the number of wireless users increases, it is desirable in a wireless system to use the available frequency spectrum in an efficient manner. In particular, given a set bandwidth, greater efficiency generally corresponds to an increased number of users and/or data throughput.

To better utilize the frequency spectrum in a wireless network, service providers have begun to implement multiple-input multiple-output ("MIMO")-based RF transmission systems. In MIMO systems, the transmitter (e.g., base station) is provided with multiple antennas capable of transmitting spatially independent signals, while the receiver (e.g., wireless unit) is equipped with multiple receive antennas. "MIMO" also encompasses systems where transmissions from a number of base stations or other transmitters are coordinated for mitigating against inter-cell interference. In both cases, by using a sophisticated signal-processing scheme to control transmissions it is possible to achieve significant increases in throughput and range without an increase in bandwidth or overall transmit power expenditure. In general, MIMO technology increases the spectral efficiency (e.g., measured as the number of information bits transmittable per second of time and per hertz of bandwidth) of a wireless communication system by exploiting the space domain, because the multiple transmission sources are physically separated in space.

MIMO systems have the potential to achieve high throughputs in wireless systems. When channel state information (CSI) is available at the transmitter, the base station can transmit to multiple users simultaneously to achieve a higher rate. For efficiently transmitting data to multiple users at the same time, the "dirty paper coding" (DPC) transmission technique has been shown to achieve the sum-rate capacity (i.e., maximum throughput) of the multiple-antenna broadcast channel. DPC is a signal processing and pre-coding scheme that allows a transmitter to send information to multiple users so that many of the users see no interference from other users, in a lossless manner (e.g., without incurring any power increase or rate loss). However, DPC is difficult to implement in practical systems due to the high computational burden of successive encodings and decodings, especially when the number of users is large.

SUMMARY OF THE INVENTION

An embodiment of the present invention relates to a method and system of MIMO communications in a multi-base wireless network, for grouping users to reduce interference. The network includes a plurality of spatially distributed base stations, each having one or more transmit antennas, and a plurality of wireless units. (By "wireless unit" or "user," it is meant mobile phones, wireless PDA's, computerized vehicle navigation systems, wireless devices with high-speed data transfer capabilities, such as those compliant with "3-G" or "4-G" standards, "WiFi"-equipped computer terminals, or the like.) In operation, the wireless units are logically divided into a plurality of user groups, through application of a semi-orthogonal user selection algorithm, e.g., a heuristic user selection algorithm based on near-orthogonality. Each user group is assigned a discrete transmission channel. (The transmission channels can have equal bandwidths, and together typically occupy the total bandwidth designated for transmissions to the wireless units. The channels may be defined in terms of frequency, time, and/or code.) Over the assigned transmission channels, data is transmitted from the transmission sources to the user groups in a coherently coordinated manner, according to a zero-forcing beamforming (ZFBF) operation. (For example, a separate ZFBF precoder may be applied to each transmission channel.) Typically, a designated transmission power constraint is applied to the base stations, by which it is meant that the sum transmission power of a base station and/or the transmission power of each transmit antenna are maintained within certain boundaries.

By combining ZFBF with semi-orthogonal user selection for grouping/allocating users to transmission channels, it is possible for the MIMO communication system to achieve asymptotically optimal performance at the limit of a large number of wireless units (i.e., performance is optimal when communicating with a large number of users). Such a system has performance levels approaching those using dirty paper coding, but is much more easily implemented in terms of signal processing and the like. System performance is robust over a wide signal-to-noise ratio range, and improves as the number of users increases and/or as the number of transmission sources decreases. In short, the communication system of the present invention offers spectrally efficient operation in a multi-base network (e.g., a network having plural base stations), and addresses or provides the following: fairness (e.g., equal minimum rate), realistic signal propagation, user outage, and power constraints that can be implemented in a practical manner in the field.

In another embodiment, the semi-orthogonal user selection process results in a certain percentage of the active wireless units in the wireless network being blocked. Thus, according to the user selection process, some of the wireless units are formed into user groups for coherently coordinated, ZFBF-based transmissions. The remaining wireless units are not assigned to groups, thereby in effect being blocked from receiving transmissions.

In another embodiment, the MIMO communication system operates in a time/frequency selective manner, e.g., over time/frequency selective fading channels. After optionally blocking a portion of active wireless units based on path loss and shadow, the remaining wireless units are allocated or assigned to a plurality of transmission channels, e.g., a plurality of time/frequency slots that divide the bandwidth apportioned for downlink transmissions to the wireless units. (In effect, groups of wireless units are formed, each of which is assigned a time/frequency slot. Thus, out of "K" total wireless units, "M" of the wireless units are allocated to each time/frequency slot, where M<<K.) The wireless units may be allocated to the time/frequency slots based on prioritization of channel strength and considerations of fairness, in conjunction with the application of a semi-orthogonal user selection algorithm. Subsequent to user allocation/grouping, signals are transmitted to the users over the transmission channels at a minimum guaranteed rate, according to ZFBF operations and a transmission power allocation. Transmission power is allocated according to a per-transmission antenna power constraint or a sum over antennas power constraint.

BRIEF DESCRIPTION OF THE DRAWINGS

The present invention will be better understood from reading the following description of non-limiting embodiments, with reference to the attached drawings, wherein below:

FIG. 8 illustrates the allocation or grouping of wireless units/users into time/frequency slots;

FIGS. 9-10B illustrate several different user allocation algorithms;

FIG. 11 is a convex optimization problem for a per-transmission source power constraint;

FIGS. 12A-12C illustrate a convex optimization problem for a sum power constraint; and FIG. 13 is a table showing a rate update process.

DETAILED DESCRIPTION

Figure 1:
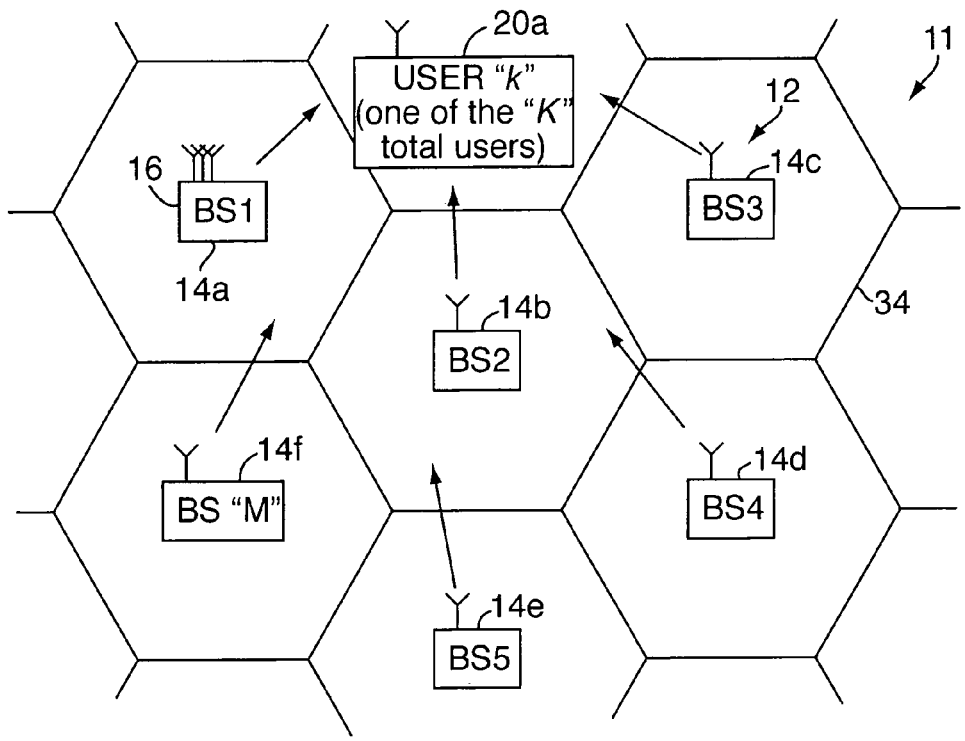
FIG. 1 is a schematic diagram of MIMO-based communications in a wireless network.

Turning to FIGS. 1-13, the present invention relates to a method and system 10 of MIMO communications in a multi-base wireless network 11. The network 11 includes a plurality of spatially distributed transmission sources 12 (e.g., multiple base stations ("BS") 14a-14f each having one or more spaced-apart transmit antennas 16) and a plurality of wireless units 20a-20e. (By "wireless unit," it is meant a mobile phone, wireless PDA, computerized vehicle navigation system, wireless devices with high-speed data transfer capabilities, such as those compliant with "3-G" or "4-G" standards, "WiFi"-equipped computer terminals, or the like.) In operation, the wireless units 20a-20e are logically divided into a plurality of user groups 22a-22c, through operation of a semi-orthogonal user selection or grouping sub-system 24. For example, the user selection sub-system 24 may implement a heuristic user selection algorithm based on near-orthogonality. Each user group 22a-22c is assigned a discrete transmission channel 26a-26c. (Typically, the transmission channels have equal bandwidths "W", and together occupy the total bandwidth 28 designated for transmissions to the wireless units in the network 11. The channels may be orthogonally defined in terms of frequency, time, or code.) Over the assigned transmission channels 26a-26c, data 30 is transmitted from the transmission sources 12 to the wireless units in the user groups 22a-22c in a coherently coordinated manner, according to a zero-forcing beamforming (ZFBF) operation. (For example, a separate ZFBF precoder 32a-32c may be applied to each transmission channel.) Typically, a designated transmission power constraint is applied to the base stations, by which it is meant that the sum transmission power of a base station and/or the transmission power of each transmit antenna are maintained within certain boundaries.

Because end users (e.g., network subscribers) utilize and control the wireless units, the terms "user" and "wireless unit" are used interchangeably in the present description. Thus, for example, references to "user groups" and the like relate to groupings of wireless units, as opposed to groupings of end users independent of the wireless units.

The system 10 may be implemented in conjunction with any type of wireless network 11, including wide area cellular, ad hoc, WiMax, and WiFi networks. Operation of the system 10 is described herein primarily with respect to a cellular telecommunications network. However, this is for illustration purposes only, and the system may be adapted for use in other types of wireless networks.

In the case of a cellular network, as noted above, the network 11 is geographically divided into a number of cells or sectors 34, which are contiguous and which together define the coverage area of the network 11. Each cell 34 is served by a base station 14a-14f, which includes one or more transmission sources 12 (e.g., fixed/stationary transceivers and antennae) for wireless communications with the wireless units 20a-20e. The base stations 14a-14f are in turn connected to a mobile switching center ("MSC"), radio network controller ("RNC"), or other upstream network entity 36.

As indicated above, the system 10 implements a method of MIMO communications, wherein RF transmissions from a plurality of spaced-apart transmission sources 12 to a plurality of wireless units 20a-20e are coherently coordinated based on zero-forcing beamforming and semi-orthogonally selected user groups. Coordinating transmissions in this manner reduces inter-cell interference, thereby increasing network capacity. FIG. 1 shows a first example of MIMO communications generally, with a number of base stations 14a-14f transmitting signals to a wireless unit "k" 20a. The wireless unit 20a is one of "K" total active wireless units in the network. ("Active" wireless unit refers to wireless units that are admitted to the network, and that require dedicated power/bandwidth resources. Those units that are within network range and powered up but are "silent" should be considered as inactive units.)

Figure 2:
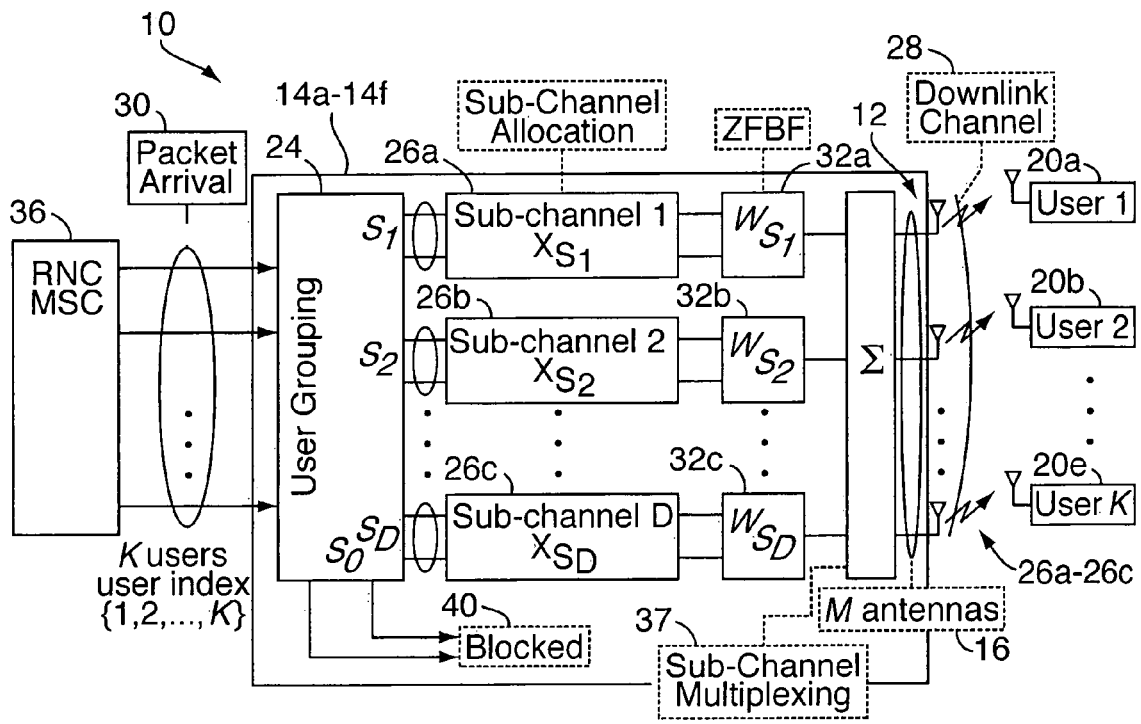
FIG. 2 is a schematic diagram of a MIMO communication system according to an embodiment of the present invention.
Figure 3:
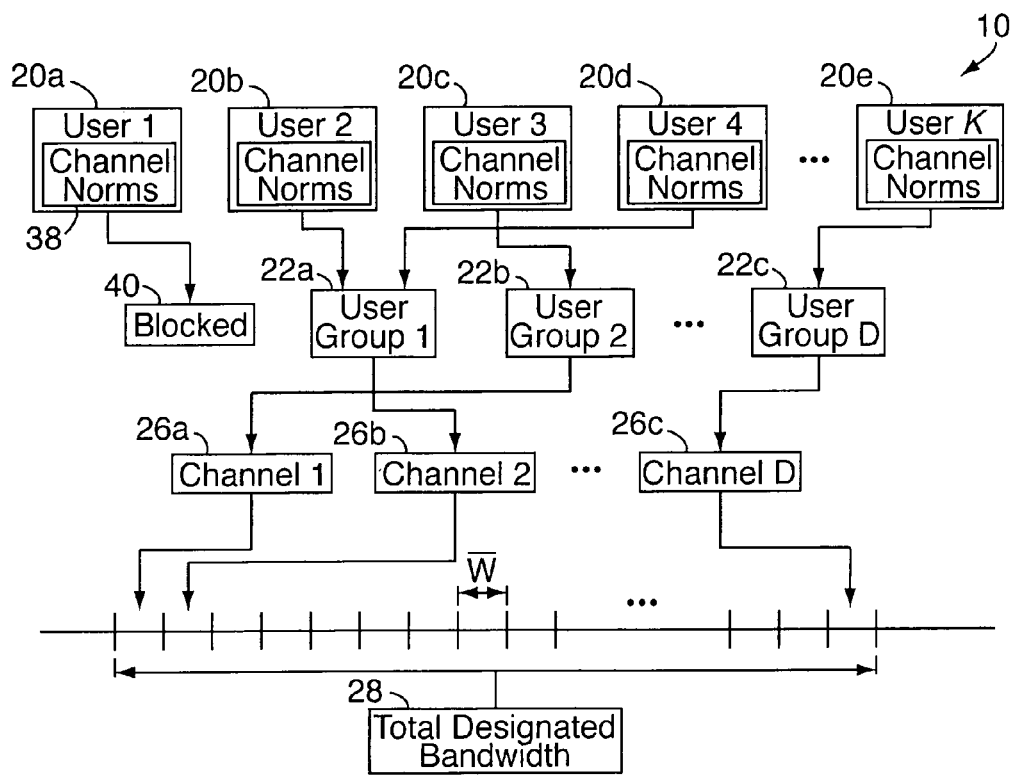
FIG. 3 is a schematic diagram showing a user grouping process according to an embodiment of the present invention.
Figure 4:
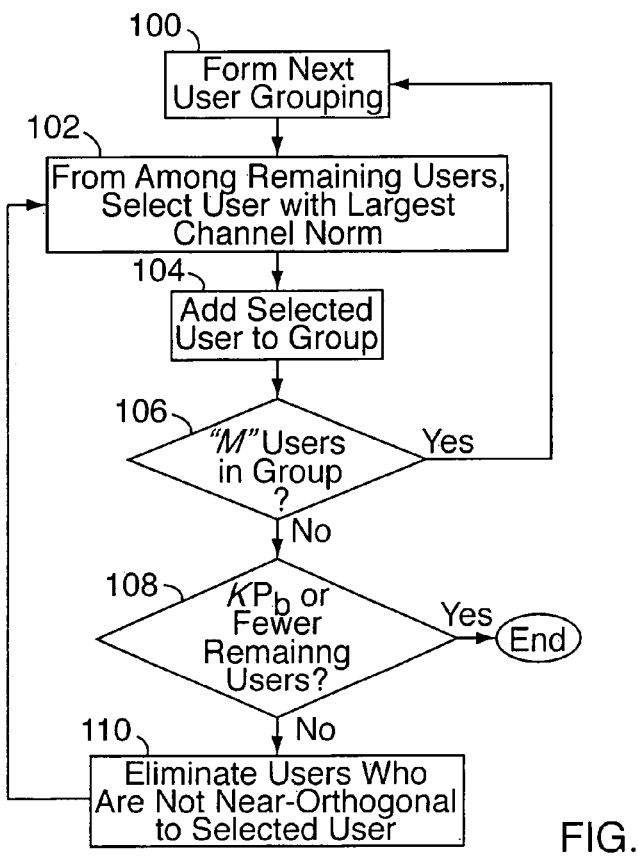
FIG. 4 is a simplified flow chart showing a method of semi-orthogonal user selection/grouping.

FIG. 2 shows a more generalized view of the system 10, where a number of transmission sources 12 transmit signals to a number of wireless units 20a-20e. (This is applicable to the case of a single base station with multiple transmission sources, as well as for multiple base stations each with one or more transmission sources.) More specifically, the system 10 is generally modeled as having "M" transmit antennas or other transmission sources 12 and K randomly placed wireless units 20a-20e. The kth user channel (i.e., logical channel for data transmissions to the user) is denoted as:

$$h_k = \|h_k\| \tilde{h}_k,$$

where $\|h_k\|$ is the magnitude of the channel vector drawn from a known distribution $g(\cdot)$, and $\tilde{h}_k$ is a unit vector that represents the channel direction, independent of $h_k$ and uniformly distributed over the unit norm sphere in the M-dimensional complex Euclidian space $C^{1 \times M}$. ($\tilde{h}_k$ being uniformly distributed is true only for the case of a single base station. It is not true for multiple base stations.) Thus, $\tilde{h}_k$ models a random phase due to a Rayleigh fading, and $g(\cdot)$ captures the channel gain that includes, for example, the effect of a path loss, shadow fading, and Rayleigh fading.

Without loss of generality, users are sorted in decreasing order of their channel norms 38:

$$\|h_i\|, \text{e.g.,} \|h_1\| > \ldots > \|h_K\|.$$

"Channel norm" 38 (see FIG. 3) refers to a measure of the quality of the current channel realization. Channel norms 38 are often obtained using fast feedback of an estimated instantaneous signal-to-interference-and-noise ratio (SNR), e.g., as estimated from broadcasted pilot signals received at the wireless units. A user blocking probability of $P_b$ is allowed, wherein the system may in effect "discard" up to $\lfloor KP_b \rfloor$ users as part of the semi-orthogonal user selection/grouping process. (In other words, subsequent to application of the semi-orthogonal user selection/grouping process, up to $\lfloor KP_b \rfloor$ users may remain unassigned to any users groups, thereby being blocked or discarded.) The semi-orthogonal user selection algorithm chooses users based on both near-orthogonality and channel norms 38. When the number of users K is very large, it is asymptotically the case that users that belong to the worst $\lfloor KP_b \rfloor$ (in terms of channel norms) have a high chance of being blocked, and users that belong to the best $\lceil K(1-P_b) \rceil$ have a high chance of being assigned to the transmission channels 26a-26c. Therefore, $\lceil K(1-P_b) \rceil$ users are asymptotically chosen as a result of the application of the semi-orthogonal user selection algorithm. In the time-frequency-selective version of the user allocation algorithm discussed below, it is possible to discard $\lfloor KP_b \rfloor$ users in advance based on their average channel norm, but this is an optional feature.

Semi-orthogonal user selection algorithms are known in the art. Reference is made to Taesang Yoo & A. Goldsmith, *On the optimality of multiantenna broadcast scheduling using zero-forcing beamforming*, IEEE Journal on Selected Areas in Communications, Volume 24, Issue 3, 528-541 (Mar 2006); Taesang Yoo & A. Goldsmith, *Optimality of zero-forcing beamforming with multiuser diversity*, 2005 IEEE International Conference on Communications, Volume 1, 542-546 (May 2005); and Taesang Yoo & A. Goldsmith, *Sum-rate optimal multi-antenna downlink beamforming strategy based on clique search*, IEEE Global Telecommunications Conference 2005, Volume 3 (28 Nov.-2 Dec. 2005), all of which are hereby incorporated by reference herein in their entireties. The system 10 of the present invention adapts and utilizes a semi-orthogonal user selection algorithm, such as those described in the aforementioned documents, for practical implementation of spectrally efficient communications in a multi-base network, with considerations of fairness (as underscored by prominence of equal rate criteria, and not a sum throughput, to be maximized), realistic signal propagation, outage constraint to be met in operating the network, and practicality in terms of a per antenna or per base station power constraint rather than a sum over all antennas/base stations power constraint.

For the users chosen as a result of the application of the semi-orthogonal user selection algorithm (e.g., up to $\lceil K(1-P_b) \rceil$ users, asymptotically), the system 10 is optionally configured to deliver an equal minimum rate "R", i.e., for fairness, each user is guaranteed at least a minimum transmission rate R. Under these conditions, the objective is to maximize the common rate R under the ZFBF constraint. Of particular interest is the asymptotic case of the number of users K growing to infinity while M (the number of transmission sources) is fixed. To maintain a non-vanishing R as K increases, a proportionate growth of the total bandwidth "W" 28 is allowed as follows $$W = \eta(1 - P_b)\overline{W},$$

where $\eta = K/M \gg 1$ is a user loading factor. The sum transmit power "P" (i.e., the system-wide transmit power) also grows linearly with K, and is constrained as follows:

$$P \leq K(1 - P_b)\overline{P},$$

where $\overline{P}$ refers to the average power available to each user. Since at most $M \ll K$ users can be simultaneously supported using ZFBF, the total bandwidth 28 is divided into "D" sub-channels 26a-26e, each having an equal bandwidth $\overline{W}$, after which a separate ZFBF precoder 32a-32c is applied to each sub-channel. The system 10 may also include a sub-channel multiplexer 37, as shown in FIG. 2.

As noted, users may be guaranteed at least a minimum transmission rate under certain embodiments of the present invention. This is applicable not only to providing guaranteed minimum transmission rates to all users in a particular group, but also to providing different guaranteed minimum transmission rates to different groups, or to different sub-groups within a group, or the like. For example, if the network has several different types or classes of wireless units, it is possible to provide equal rates for all wireless units within a class, but to have different equal rates from class to class. It also possible for the system to be configured in other manners as relating to transmission rates, e.g., equal minimum rates are not guaranteed, or only certain users or classes of users are guaranteed an equal minimum rate.

ZFBF operations are characterized as indicated in FIG. 2. The set of users assigned to the "i th" sub-channel 26a-26c is denoted as $S_i \subseteq \{1, \ldots, K\}$, $i=1, \ldots, D$. (The process for assigning or allocating users to sub-channels is discussed in more detail below.) The set of blocked users 40 is denoted as $S_0 \subseteq \{1, \ldots, K\}$. Then, $S_0, \ldots, S_D$ partition $\{1, \ldots, K\}$ and satisfy $|S_0| \leq \lfloor KP_b \rfloor$, $|S_i| \leq M$, for $i=1, \ldots, D$. Let $y_k$ and $z_k$ be the received signal and the additive noise, respectively, at user k. The stacked channel matrix for the users in $S_i$ is denoted as $H_{S^i} \in C^{|S_i| \times M}$, i.e., the rows of $H_{S^i}$ are channels of the users in $S_i$. The received signal vector $y_{S^i} \in C^{|S_i| \times 1}$ and the noise vector $z_{S^i} \in C^{|S_i| \times M}$ are defined in a similar manner. The transmit symbol vector for $S_i$ is denoted as $x_{S^i}$. Thus:

$$y_{S^i} = H_{S^i} x_{S^i} + z_{S^i}.$$

In ZFBF with a common rate support, the vector $x_{S^i}$ is given by $x_{S^i} = (\sqrt{\gamma}) W_{S^i} s_{S^i}$, where $\gamma$ is the target received signal power, $W_{S^i} = H^*_{S^i}(H_{S^i} H^*_{S^i})^{-1}$, the pseudo-inverse of $H_{S^i}$, and $s_{S^i}$ is the information symbol vector for the users with a normalized power $\epsilon(\|s_{S^i}\|^2) = 1$. This gives the following:

$$y_{S^i} = (\sqrt{\gamma}) s_{S^i} + z_{S^i}, \text{ or } y_k = (\sqrt{\gamma}) s_k + z_k \text{ for } \forall k \in S_i.$$

Thus, every non-blocked user achieves the same rate:

$$R = (W/D) \log_2(1 + (\gamma/(N_0 W/D))),$$

where $N_0$ is the noise power spectral density at each user. The target received power $\gamma$ is determined by the power constraint P.

As noted above, prior to ZFBF operations, the user selection sub-system 24 divides up to $\lceil K(1-P_b) \rceil$ of the wireless units 20b-20e into a plurality of user groups 22a-22c, each of which is assigned a discrete transmission sub-channel 26a-26c. In one embodiment, for example, the user selection sub-system 24 implements a heuristic user selection/grouping algorithm based on near-orthogonality. By grouping users semi-orthogonally in combination with ZFBF, the common transmission rate R of the system 10 approaches its theoretical interference-free upper bound as the number of users K grows large.

For semi-orthogonal grouping, the users 20a-20e are grouped into a number of channels 26a-26c, each of which includes at most M users, where $M \ll K$. This is done according to a heuristic and greedy user selection algorithm based on near-orthogonality, as shown in simplified form in FIG. 4. The process starts at Step 100, for forming the first user group 22a. At Step 102, the user grouping sub-system 24 selects the user with the largest channel norm 38. This user is added to the user group at Step 104. If M users have been chosen for the group, as determined at Step 106, or if there are no more candidate users for possible inclusion in the current group, the current group is considered complete and the process continues at Step 100 for forming the next group. If $\lfloor KP_b \rfloor$ users remain, as determined at Step 108, the process ends. Otherwise, at Step 110, the sub-system eliminates the remaining users that are not near-orthogonal to the selected user. ("Eliminate" means that the user is withdrawn as a potential candidate for the current group; eliminated users may eventually be assigned to other groups, or blocked for transmissions if they have low channel norms or otherwise.) Of the remaining users, all of which are near-orthogonal to the selected user, the sub-system 24 selects the user with the largest channel norm 38, as at Step 102. This user is added to the first selected user in the user group, as at Step 104, and the process continues as described above until the group is complete or until $\lfloor KP_b \rfloor$ users are left. For the next and subsequent groups, this process is repeated for users that have not yet been assigned to groups, until no more than $\lfloor KP_b \rfloor$ users remain. As noted above, when the number of users K is very large, it is asymptotically the case that users that belong to the worst $\lfloor KP_b \rfloor$ have a high chance of being blocked.

The user grouping process is based on a semi-orthogonal user selection algorithm, in particular, a greedy user selection or greedy weighted clique algorithm. (Semi-orthogonal user selection algorithm, greedy user selection algorithm, and the weighted clique algorithm refer generally to the same thing. All the semi-orthogonal user selection algorithms have a greedy nature in the sense that they try to select the best user at each iteration.) A greedy user selection algorithm is advantageous for its simplicity. However, other semi-orthogonal user selection algorithms could be used instead. According to the semi-orthogonal user selection algorithm, a group of users $S_i$, $|S_i| \leq M$ is selected such that the selected users are near orthogonal within $\epsilon$, e.g., $|\tilde{h}_k \tilde{h}_j^*| < \epsilon$, $\forall k, j \in S_i$, $k \neq j$. The algorithm also attempts to maximize the users' channel magnitudes by choosing, for each iteration, the user with the largest channel magnitude amongst users that satisfy the near-orthogonality constraint. The users selected from a single run of the semi-orthogonal user selection algorithm are assigned a transmission sub-channel 26a-26c. The semi-orthogonal user selection algorithm is repeatedly applied to the remaining users until no more than $\lfloor KP_b \rfloor$ users remain unassigned.

Figure 5:
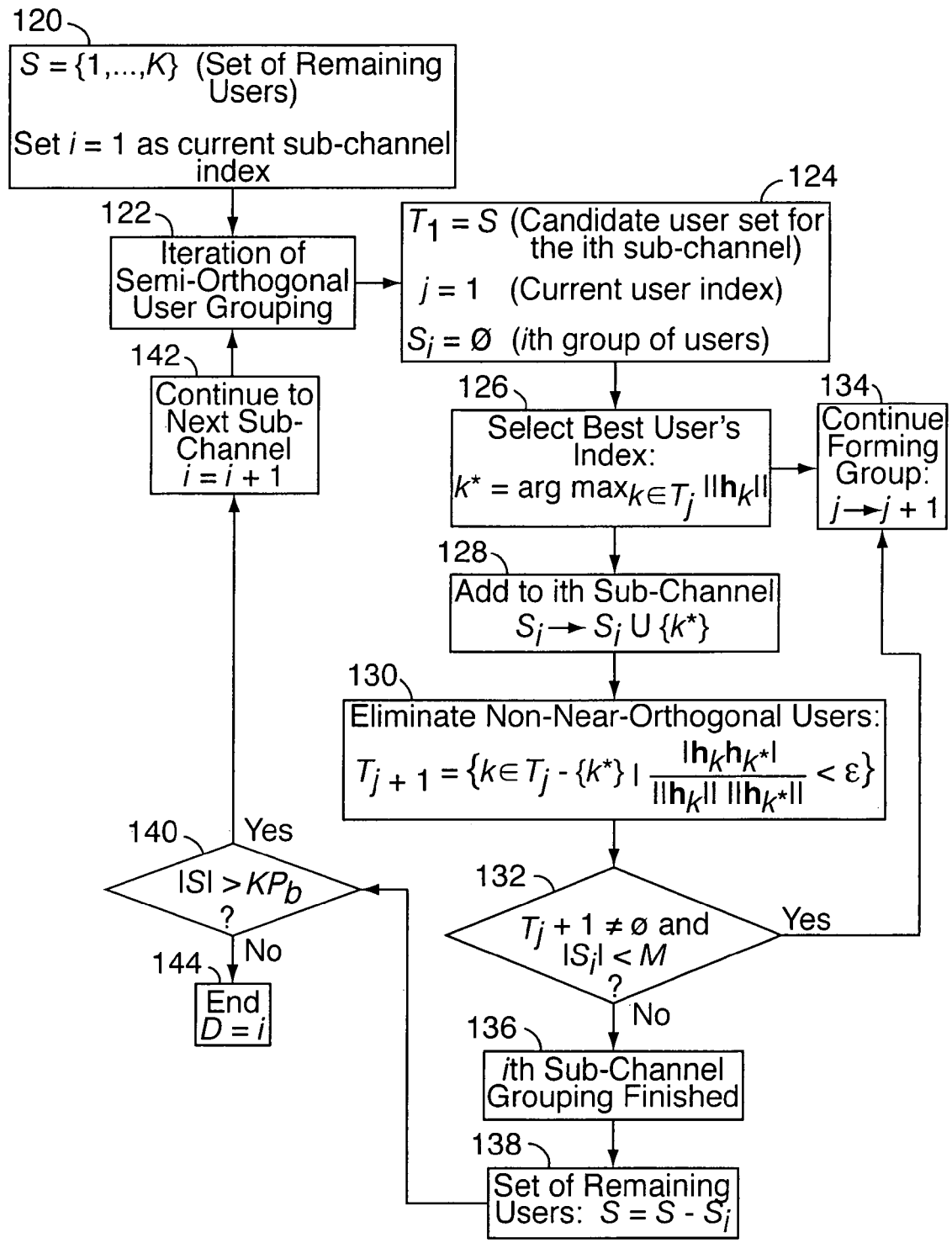
FIG. 5 is a flow chart showing the method of semi-orthogonal user selection/grouping in more detail.

This process is shown in more detail in FIG. 5. At Step 120, a current sub-channel index i is set to $i=1$. $S = \{1, \ldots, K\}$ is the set of remaining users. At Step 122, a first iteration of the semi-orthogonal user selection algorithm is carried out for forming a first user group. Step 124 indicates that: $T_1 = S$ is the candidate user set for the i th sub-channel (i.e., the candidate users for possible inclusion in the i th sub-channel are those left in the set of remaining users S); $j=1$ is a current user index; and $S_i = \emptyset$ (empty set) for the i th group of users (i.e., the current group of users is initially empty). At Step 126, the user with the largest channel norm is selected, as indicated. At Step 128, the selected user is added to the current group. At Step 130, users that are not near-orthogonal to the selected user are eliminated for possible inclusion in the current group. At Step 132, it is determined if the current group $S_i$ has fewer than M members, and if there are still candidate members available for possible inclusion in the current group. If so, the user index is incremented at Step 134, and the process continues at Step 126 for adding more users to the group. If not, the i th sub-channel/user grouping is considered complete, as at Step 136. At Step 138, the users added to the i th sub-channel are removed from the set of remaining users S. At Step 140, it is determined if there are more than $\lfloor KP_b \rfloor$ users left. If so, the process continues for assigning users to the next sub-channel, as at Step 142, through another iteration of the semi-orthogonal user grouping algorithm at Step 122 et seq. If not, the process ends at Step 144, with up to $\lfloor KP_b \rfloor$ remaining users being blocked for transmissions. The semi-orthogonal user grouping procedure is asymptotically optimal, efficiently eliminating multi-stream interference among the group of users in the same sub-channel.

After the user grouping process is completed, the total bandwidth 28, e.g., $W = \eta(1 - P_b) \overline{W}$, is divided into D equal-bandwidth sub-channels, where D=i as indicated in FIG. 5. In other words, for as many user groups 22a-22c are formed, the available bandwidth is divided into that many sub-channels 26a-26c. The users in $S_i$ are then assigned to the i th sub-channel and are supported using ZFBF as explained above.

The system 10 is based on an equal bandwidth ZFBF scheme. The rate (and the upper bound) could be further improved by using a flexible bandwidth allocation, which does not yield a closed form expression but requires joint optimization of bandwidths and powers. For example, the interference free upper bound can be further improved by solving the convex optimization problem 42 shown in FIG. 6, for the optimal bandwidth and power allocations amongst users. $W_k$ is the bandwidth allocation for the user k. ZFBF can also be improved in a similar manner.

As should be appreciated, where the system 10 is characterized herein as involving the formation of user groups and then assigning sub-channels to the groups, these steps are typically carried out simultaneously by assigning selected users to sub-channels, according to a semi-orthogonal user selection algorithm, in a manner as described above. The users in each sub-channel constitute a de facto user group or grouping.

Turning now to FIGS. 7-12C, an additional embodiment of the MIMO communication system 50 is applicable to multi-cell transmissions over time/frequency selective fading channels. Signal-fading phenomena can drastically affect the performance of a terrestrial communications system. Often caused by multi-path conditions, fading can degrade the bit-error-rate (BER) performance of a digital communications system, resulting in lost data or dropped calls. Frequency selective fading is a radio propagation anomaly caused by partial cancellation of a radio signal by itself—the signal arrives at the receiver by multiple paths, and at least one of the paths is changing (e.g., lengthening or shortening). This causes different frequencies of the received signal to be attenuated and phase shifted differently in the transmission channel. The system 50 takes advantage of frequency selective fading, because users are chosen with "highest priority" for each channel.

The system 50 is configured to carry out a method of MIMO communications in a time/frequency selective manner. The system includes a designated downlink/forward link bandwidth 28, which is logically divided into a number of MIMO downlink channels 52 as discussed below. The communication network is similar to as shown in FIG. 1, and includes "M" transmission sources (e.g., M cells each with a single antenna base station) and "K" single-antenna wireless units or users randomly placed in the network. Signals transmitted from the base stations to the users are considered to experience path loss (i.e., signal attenuation), with independent log-normal shadowing and Rayleigh fading for each user. Rayleigh fading is independent over time/frequency. (As should be appreciated, log-normal shadowing, Rayleigh fading, etc. are mathematical models of the distortion that a carrier-modulated telecommunication signal experiences over certain propagation media, and as such are only approximations or idealizations of real RF signal propagation characteristics.) The system 50 may be configured to deliver a common minimum rate "R" to each user using ZFBF over the transmission channels 52. The transmission apparatus of the system 50 is configured similarly to that shown in FIG. 2.

Figures 6, 7:
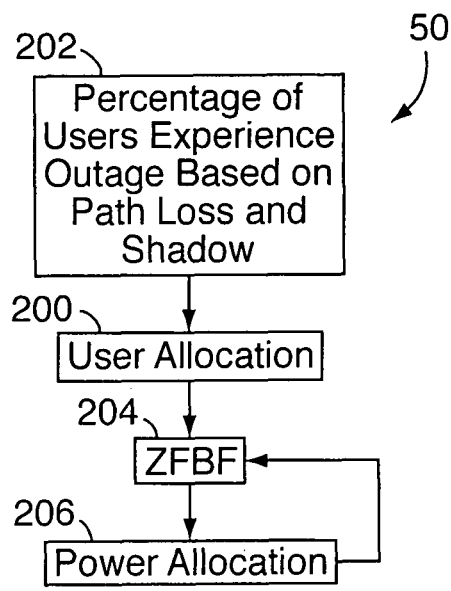
FIG. 6 is a convex optimization problem for optimizing bandwidth and power allocations amongst users.
FIG. 7 is a flow chart illustrating operation of an additional embodiment of the MIMO communication system.

FIG. 7 summarizes operation of the MIMO communication system 50. At Step 200, active users are allocated or assigned to the transmission channels 52. In effect, groups of wireless units are formed, each of which is assigned a time/frequency slot. Thus, out of K total wireless units, M or fewer of the wireless units are allocated to each time/frequency slot, where M<<K. Subsequent to user allocation at Step 200, signals are transmitted to the users according to the channel allocations, using ZFBF at Step 204 and a power allocation at each base station or other transmission source, as at Step 206.

As indicated at 202, as an optional feature, a portion of the active users may be blocked based on path loss and shadow. In other words, a certain percentage of users (e.g., $\lfloor KP_b \rfloor$ users) will experience poor channel conditions due to path loss and shadow, and these users are temporarily blocked for transmissions by being excluded from assignment to the transmission channels. In the case of the blocked users discussed above, the blocking results from the user selection process, e.g., certain users may not be assigned to groups, and, therefore, are in effect blocked. Here, prior to assignment, the system discards up to $\lfloor KP_b \rfloor$ users, based on having the poorest channel norms among the wireless units 20a-20e, or upon other, similar criteria.

As shown in FIG. 8, the designated transmission time/frequency bandwidth 28 (TW) is divided into "T" transmission channels 52, each of which is a time/frequency slot 54. Thus, in the case of T=200, for example, there could be 200 time slots in a flat fading time varying channel, 200 frequency slots in a frequency selective static channel, or 20 time slots, each divided into 10 frequency slots, in a time/frequency selective channel. As indicated, the users are allocated to the time/frequency slots 54 in a manner wherein each user is either scheduled in a particular slot or not. Transmission power is allocated in each time/frequency slot, such that each user is guaranteed the minimum rate R and the transmission power at each transmission source is constrained as TP.

The user allocation process 200 can be carried out according to one of several different heuristic algorithms. For example, it would be possible to choose M users at random for allocating to each time/frequency slot 54. It would also be possible to choose M users for each time/frequency slot 54 according to those having the highest channel strengths. With reference to FIG. 9, for example, users could be prioritized as indicated in Step 208 (the indicated equation is the ratio of the user's instantaneous channel strength to its average channel strength), and the M users with the highest priority would be chosen at Step 210. Still further, users could be prioritized as indicated in FIG. 9, with the subsequent application of a semi-orthogonal user selection algorithm to choose one user group, similarly to the manner described above with respect to FIG. 5. (For example, at Step 126, the user with the highest priority would be selected and grouped with near-orthogonal users until M users were selected for the time/frequency slot allocation.)

Alternatively, for improved results, users could be allocated to each time/frequency slot 54 according to considerations of fairness, for example, as shown in FIGS. 10A and 10B. In FIG. 10A, users are assigned to time/frequency slots 54 based on priority of channel conditions and fairness. For each time/frequency slot, at Step 212, users are prioritized as indicated, for promoting fairness, where $f_k(t)=2^{\{-\text{expected cumulative rate of user k through channels 1 to t+mean of expected cumulative rates of all users through channels 1 to t}\}}$. Those users with higher cumulative rate have a smaller $f_k(t)$, and thus their priorities are reduced by the amount by which their cumulative rate exceeds the league average among all users. This has a similar role as the rate discount factor used in the proportional fair scheduling process. At Step 214, the M users with the highest priority are chosen for allocation to the time/frequency slot in question. In FIG. 10B, users are allocated according to prioritization, fairness, and a semi-orthogonal selection. Thus, users are prioritized as at Step 212, but at Step 216, a semi-orthogonal user selection algorithm is applied to choose one user group for allocation to the time/frequency slot in question. Based on numerical analysis, best results may be achieved using the method summarized in FIG. 10B.

Power allocation, as at Step 206 in FIG. 7, can be based on a per-transmission source power constraint or a sum power constraint. The former may be defined as a convex optimization problem 56, e.g., as shown in FIG. 11, which can be solved using standard convex optimization techniques. (It is possible to use other optimization procedures. As such, the convex optimization technique(s) described herein are merely exemplary.) Power allocation based on a sum power constraint is also a convex optimization problem 58, as shown in FIG. 12A, which is feasible if $P^*_{min} \leq PMTP$. A Lagrangian 60 for this is as shown in FIG. 12B. Setting $\partial L/\partial P=0$ and $\partial L/\partial P_{kt}=0$ results in equations 62 and 64 as shown in FIG. 12C. Here, $\lambda$ is a Lagrange multiplier associated with the positivity of individual power constraints. $v$ is a Lagrange multiplier associated with the sum power constraint. Finally, $\omega$ is a Lagrange multiplier associated with the rate requirement. In operation, R is updated, followed by determinations of $\{\omega_k\}$ and $\{P_{kt}\}$. Subsequently, the power constraint $P_{kt}$ is checked, and the process continues by again updating R. For a given R, the Lagrange multipliers $\omega$ for each k are obtained from equation 64. Then, $P_{kt}$ and $P_{min}$ are obtained from equation 62 and equation 66, respectively. If the obtained $P_{min}$ is feasible, then the rate R can be increased. If $P_{min}$ is infeasible, the rate R is decreased. The update on R can be done, for example, by using bisection as in the table in FIG. 13.

The methods, processes, and/or algorithms described herein may be implemented using electronic hardware, software (e.g., scripts, software programs, suites of software programs), or a combination of the two, using standard programming, signal processing, and/or electrical design methods. Backhaul communication links are required. The implementation also requires that hardware and software accommodate the measuring and transmission of channel state information for each base antenna to user antenna link. The timely availability of channel state information is required for carrying out the network coordination algorithms.

Although the method and system have been primarily illustrated as involving semi-orthogonal groupings of users within a frequency band, other means can be used to group users, based on different orthogonal ways of nominally disjoint partitioning of communication resources. For example, it would be possible to group a plurality of terminals using (i.e., within) a CDMA code, in place of grouping within a frequency band. Doubling the number of orthogonal dimensions to partition, using two states of polarization instead of one, is also possible.

The method and system of the present invention are applicable to situations involving sectorization, which is relatively common in wireless networks. Distinct sectors in a given cell are nominally un-coupled, and thereby nominally non-interfering. But each user in a sector of a cell can be interfered with by transmissions originating from certain sectors in certain nearby cells. Advantageously, it is possible to group such user subsets to avoid interference among such a subset of users prone to otherwise interfere because of their geographical disposition relative to certain sectors in certain cells.

Since certain changes may be made in the above-described system of MIMO communications in a wireless network, for grouping users to reduce interference, without departing from the spirit and scope of the invention herein involved, it is intended that all of the subject matter of the above description or shown in the accompanying drawings shall be interpreted merely as examples illustrating the inventive concept herein and shall not be construed as limiting the invention.

We claim:

1. A method of MIMO communications in a wireless network, said network having a plurality of wireless units and at least first and second base stations, each of the first and second base stations having one or more transmit antennas, wherein the method comprises the steps of:

forming a user group based at least in part on a semi-orthogonal selection of a subset of said plurality of wireless units; and transmitting data from at least the first and second base stations over an assigned transmission channel to the wireless units in said user group, wherein the data transmitted from at least the first and second base stations is transmitted according to a zero-forcing beamforming (ZFBF) operation and at least one designated transmission power constraint is applied to at least the first and second base stations, and wherein the at least one designated transmission power constraint comprises at least one of (1) a first transmission power constraint applied on a per-transmission basis for each of at least first and second transmit antennas respectively associated with at least the first and second base stations, and (2) a second transmission power constraint applied on a per-base station basis for all of the transmit antennas associated with each of at least the first and second base stations.

2. The method of claim 1 further comprising:

forming a plurality of user groups each comprising a unique subset of said plurality of wireless units, wherein the wireless units in each user group are semi-orthogonally selected from among the plurality of wireless units;

assigning a discrete transmission channel to each user group; and transmitting data from the plurality of the base stations to the wireless units in the user groups over respective assigned transmission channels, wherein the data transmitted from at least the first and second base stations is transmitted according to a ZFBF operation and at least one designated transmission power constraint of the base station antennas.

3. The method of claim 2 wherein the transmission channels have equal bandwidths, and the data is transmitted to the wireless units in the user groups according to at least one equal minimum rate.

4. The method of claim 2 wherein:

the user groups are comprised of the wireless units in a first subset of said plurality of wireless units; and the wireless units in a second subset of said plurality of wireless units are blocked from receiving transmissions over the network, said second subset comprising all the wireless units in the plurality of wireless units other than those in the first subset, wherein the first and second subsets are formed based in part on channel norms of the plurality of wireless units.

5. The method of claim 2 wherein the wireless units in each user group are semi-orthogonally selected according to a greedy user selection algorithm that includes a near-orthogonality assessment of the wireless units.

6. The method of claim 2 wherein the at least one designated transmission power constraint is imposed and met in an optimization procedure.

7. An apparatus for use in a MIMO communications system, said system including a plurality of wireless units and at least first and second base stations, each of the first and second base stations having one or more transmit antennas, the apparatus comprising:

a processing unit configured to form a user group based at least in part on a semi-orthogonal selection of a subset of said plurality of wireless units, and to assign a transmission channel over which data is transmitted from at least the first and second base stations to the wireless units in said user group according to a zero-forcing beamforming (ZFBF) operation and at least one designated transmission power constraint applied to at least the first and second base stations, wherein the at least one designated transmission power constraint comprises at least one of (1) a first transmission power constraint applied on a per-transmission basis for each of at least first and second transmit antennas respectively associated with at least the first and second base stations, and (2) a second transmission power constraint applied on a per-base station basis for all of the transmit antennas associated with each of at least the first and second base stations.

8. The apparatus of claim 7 wherein:

the processing unit is further configured to form a plurality of user groups each comprising a unique subset of said plurality of wireless units, wherein the wireless units in each user group are semi-orthogonally selected from among the plurality of wireless units; and wherein a discrete transmission channel is assigned to each user group so that data is transmitted from at least the first and second base stations to the wireless units in the user groups over respective assigned transmission channels according to a ZFBF operation and at least one designated transmission power constraint of the base station antennas.

9. The apparatus of claim 8 wherein the transmission channels have equal bandwidths, and the data is transmitted to the wireless units in the user groups according to at least one equal minimum rate.

10. The apparatus of claim 8 wherein:

the user groups are comprised of the wireless units in a first subset of said plurality of wireless units; and the wireless units in a second subset of said plurality of wireless units are blocked from receiving transmissions, said second subset comprising all the wireless units in the plurality of wireless units other than those in the first subset, wherein the first and second subsets are formed based in part on channel norms of the plurality of wireless units.

11. The apparatus of claim 8 wherein the wireless units in each user group are semi-orthogonally selected according to a greedy user selection algorithm that includes a near-orthogonality assessment of the wireless units.

12. The apparatus of claim 8 wherein the at least one designated transmission power constraint is imposed and met in an optimization procedure.

13. A communications system for implementing MIMO communications in a wireless network, said network having a plurality of wireless units and at least first and second base stations, each of the first and second base stations having one or more transmit antennas, said communications system comprising:

a network interface configured to communicate with at least the first and second base stations; and a processing unit configured to form a user group based at least in part on a semi-orthogonal selection of a subset of said plurality of wireless units;

wherein said communications system assigns a transmission channel to the wireless units in said user group over which data may be transmitted from at least the first and second base stations to the wireless units in said user group according to zero-forcing beamforming (ZFBF) operation and at least one designated transmission power constraint applied to at least the first and second base stations; and wherein the at least one designated transmission power constraint comprises at least one of (1) a first transmission power constraint applied on a per-transmission basis for each of at least first and second transmit antennas respectively associated with at least the first and second base stations, and (2) a second transmission power constraint applied on a per-base station basis for all of the transmit antennas associated with each of at least the first and second base stations.

14. The communications system of claim 13 wherein:

the processing unit is further configured to form a plurality of user groups each comprising a unique subset of said plurality of wireless units, wherein the wireless units in each user group are semi-orthogonally selected from among the plurality of wireless units; and wherein said communications system assigns a discrete transmission channel to each user group so that data is transmitted from the network interface entity via at least the first and second base stations to the wireless units in the user groups over respective assigned transmission channels according to a ZFBF operation and at least one designated transmission power constraint of the base station antennas.

15. The communications system of claim 14 wherein the transmission channels have equal bandwidths, and the data is transmitted to the wireless units in the user groups according to at least one equal minimum rate.

16. The communications system of claim 14 wherein:

the user groups are comprised of the wireless units in a first subset of said plurality of wireless units; and the wireless units in a second subset of said plurality of wireless units are blocked from receiving transmissions over the network, said second subset comprising all the wireless units in the plurality of wireless units other than those in the first subset, wherein the first and second subsets are formed based in part on channel norms of the plurality of wireless units.

17. The communications system of claim 14 wherein the wireless units in each user group are semi-orthogonally selected according to a greedy user selection algorithm that includes a near-orthogonality assessment of the wireless units.

18. The communications system of claim 14 wherein the at least one designated transmission power constraint is imposed and met in an optimization procedure.

* * * * *